No. 739,194. PATENTED SEPT. 15, 1903.
D. LUBIN.
AGRICULTURAL IMPLEMENT.
APPLICATION FILED MAY 15, 1903.
NO MODEL.

WITNESSES:

INVENTOR
David Lubin
BY
ATTORNEYS

No. 739,194. Patented September 15, 1903.

UNITED STATES PATENT OFFICE.

DAVID LUBIN, OF NEW YORK, N. Y.

AGRICULTURAL IMPLEMENT.

SPECIFICATION forming part of Letters Patent No. 739,194, dated September 15, 1903.

Application filed May 15, 1903. Serial No. 157,254. (No model.)

*To all whom it may concern:*

Be it known that I, DAVID LUBIN, a citizen of the United States, and a resident of the city of New York, borough of Manhattan, in the county and State of New York, have invented a new and Improved Agricultural Implement, of which the following is a full, clear, and exact description.

This invention relates to improvements in agricultural implements of the kind having a plurality of sets of cultivating or groundbreaking tines, an object being to provide an implement of this character so constructed that each set of tines shall have an independent vertical movement under a varying weight pressure, so that the tine or tines of a set, should they strike an obstruction, will rise and pass over the obstruction without lifting the other teeth or causing the machine to veer from a straight course, which, obviously, is a very essential feature in cultivating growing plants.

Other objects of the invention will appear in the general description.

I will describe an agricultural implement embodying my invention and then point out the novel features in the appended claims.

Reference is to be had to the accompanying drawings, forming a part of this specification, in which similar characters of reference indicate corresponding parts in both figures.

Figure 1:
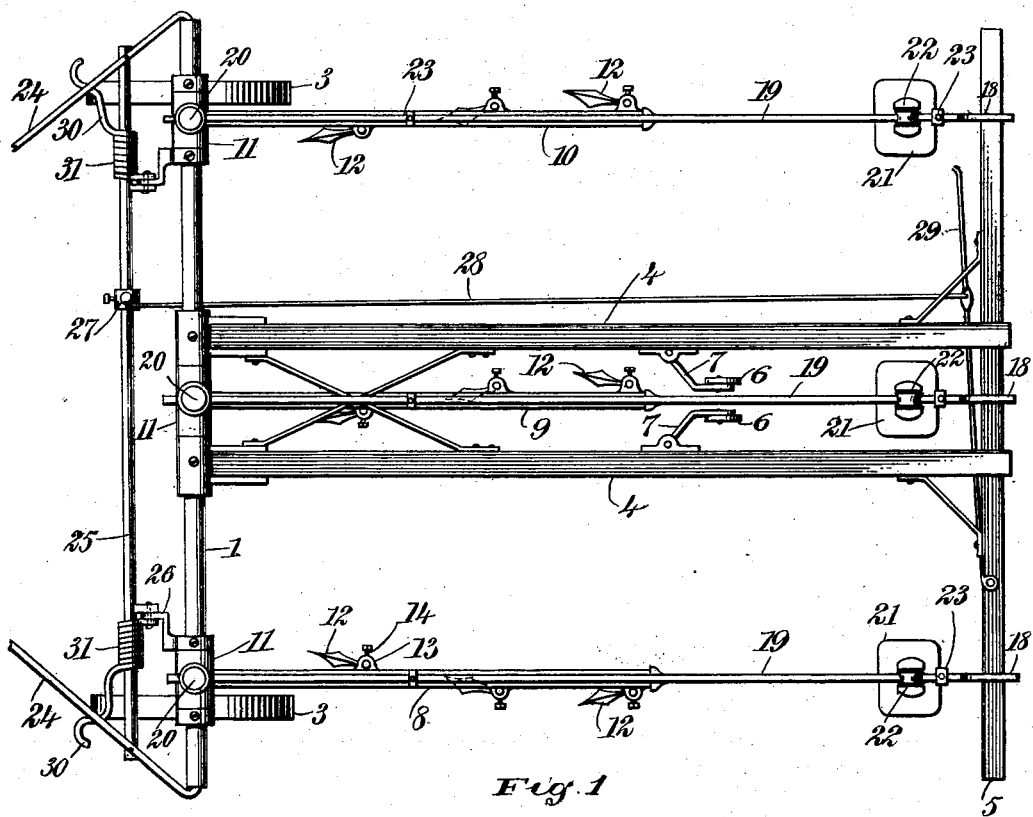
Figure 2:
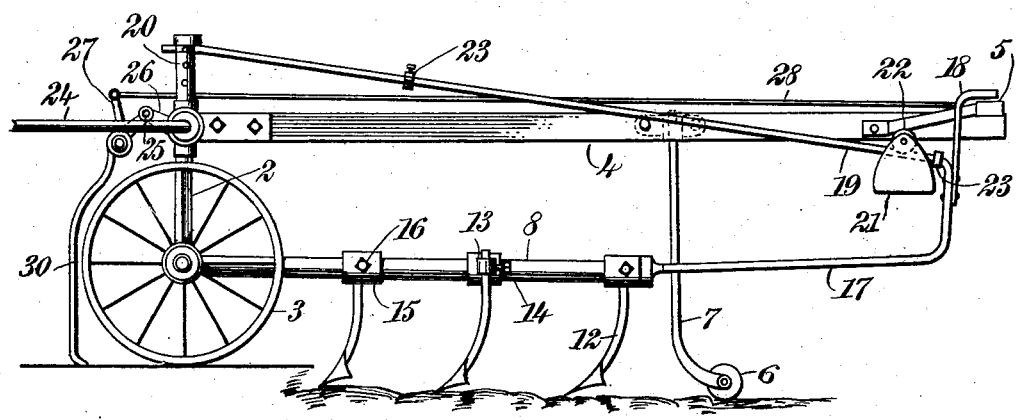

Figure 1 is a plan view of an agricultural implement embodying my invention, and Fig. 2 is a side elevation thereof.

Referring to the drawings, 1 designates an axle-bar, from the ends of which posts 2 extend downward, and on these posts are the spindles for the front bearing-wheels 3. By arching the axle, as shown, the machine may be readily passed over growing plants. Extended rearward from the axle 1 are framebars 4, connected at the rear by a cross-bar 5, the said cross-bar being extended the full width of the machine, as clearly indicated in the drawings. Supporting-rollers 6 are attached to legs 7, extended downward from the rails or frame-bars 4. Mounted to swing independently one of another on the axle are bars 8 9 10, these bars being connected by means of uprights at the forward ends with sleeves 11, mounted to turn on the axle. Attached to each bar is a series of cultivator-teeth or digging-tools 12. These tools are adjustable vertically with relation to the bars and are also adjustable lengthwise thereof, and, further, they may be adjusted as to the angle of their lower ends.

As here shown, the shank portion of each tool passes through an opening in a lug 13, provided with a set-bolt 14, and the lug is extended from a collar 15, adjustable on a bar and held as adjusted by a set-bolt 16. Each tooth or tool-carrying bar has a rearward extension 17, provided with an upwardly-extended hook portion 18, which rests loosely on the top of the cross-bar 5, and from this upwardly-extended portion of the extension or bar 17 a rail or track 19 extends at an upward angle to a connection with a post 20, extended upward from the sleeve 11. Movable on each rail 19 is a weight 21, and preferably the weight is provided with a roller 22, which bears on the rail. The weight is designed under certain conditions to shift from one position to another, and to regulate the degree of movement as conditions may require stop-collars 23 are adjustably arranged on the track.

This implement is designed to be drawn over the ground, preferably, by a power device shown in my Patent No. 714,313, dated November 25, 1902, and the draft-cable thereof will be attached to rods 24, extended from the ends of the axle 1 and converging to the front of the machine, and to cause the teeth or digging-tools to penetrate the ground to a desired depth I have provided a means for raising and lowering the rods 24, so that the plane of draft may be regulated—that is, it is obvious that when the plane of draft is at a certain height the teeth will be caused to dig deeper into the ground than when the draft is on a lower plane. These rods 24 are attached to a rock-shaft 25, mounted to swing in brackets 26, and from an upwardly-extended arm 27 on said shaft a rod 28 extends rearward to a connection with a lever 29, pivoted to the bar 5. A yielding clearing device is arranged forward of each wheel 3, these clearing devices being designed to scrape or push away loose material that may be on the surface of the ground. Each clearing device consists of a tooth 30, having a spring-yielding coil portion 31, through which the shaft 25 passes, and the end of this coil is attached to a pivot connecting the shaft with the bracket. By so connecting the clearing devices with the shaft it is obvious that by elevating the rear portion of the machine while moving it from one place to another without doing any work the said clearing devices may be raised so as to clear the ground by drawing upon the lever 29 and rocking the rock-shaft.

In the operation as the machine is drawn forward and all the digging-tools are performing work in the ground the several weights 21 will remain at the rear portion or at the limit of their rearward movement on the rails 19. Should one or more of the teeth of a set strike an obstruction in the ground—such as a rock, a chunk of wood, or a tree-root—the set will be deflected upward and the weight 21 will automatically shift forward, thus releasing or lessening the weight on the teeth, and of course the higher the teeth are raised by the obstruction the farther forward the weight will move. This shifting of the weight will cause a uniform draft power, and therefore will prevent lateral swinging or shearing of the machine in passing along the ground.

Agricultural implements have heretofore been provided with shifting weights; but the shifting must be done manually, while in this instance the operator of the machine is relieved of all responsibility or care, as the weights shift automatically.

Having thus described my invention, I claim as new and desire to secure by Letters Patent—

1. An agricultural implement, comprising a plurality of sets of tines or teeth mounted to swing vertically, independently one set of another, and a variable-pressure device having free sliding movement on each set.

2. An agricultural implement, comprising a plurality of sets of tines or teeth mounted to swing vertically, independently one set of another, and an automatically-shifting weight carried by each set.

3. An agricultural implement, comprising a plurality of sets of tines or teeth mounted to swing vertically, independently one set of another, a track or rail arranged above each set and at an upward and forward incline, and a weight adapted to automatically move along said track or rail.

4. An agricultural implement, comprising a wheel-supported axle, bars extended rearward from said axle, a cross-bar connecting the rear ends of said bars, tooth-carrying bars having swinging connection with the axle, rearward extensions on said tooth-carrying bars having portions for engaging loosely with said cross-bar, a rail above each tooth-carrying bar, and a weight mounted to slide along said rail.

5. An agricultural implement, comprising a wheel-supported axle, a plurality of tooth-carrying bars having swinging connection with the axle, a frame attached to the axle, supporting-rollers on said frame, rearward extensions on the tooth-carrying bars having upwardly-extended hook portions for engaging loosely on the rear member of said frame, tracks extended at a forward and upward angle from said upward extensions, and weights movable along said tracks.

6. In an agricultural implement, a wheel-supported axle, draft devices extended from said axle, a rock-shaft on which said draft devices engage, means for rocking the rock-shaft, and a clearing-tooth forward of each wheel, the said clearing-teeth having spring-yielding coil portions extending around the rock-shaft.

In testimony whereof I have signed my name to this specification in the presence of two subscribing witnesses.

DAVID LUBIN.

Witnesses:
JNO. M. RITTER,
C. R. FERGUSON.